United States Patent
Vijn et al.

(10) Patent No.: US 9,567,509 B2
(45) Date of Patent: Feb. 14, 2017

(54) LOW DOSAGE POLYMERIC NAPHTHENATE INHIBITORS

(75) Inventors: Jan P. Vijn, Nijmegen (NL); Peter in't Veld, Oldenzaal (NL)

(73) Assignee: Ecolab USA Inc., St. Paul, MN (US)

( * ) Notice: Subject to any disclaimer, the term of this patent is extended or adjusted under 35 U.S.C. 154(b) by 709 days.

(21) Appl. No.: 13/450,892

(22) Filed: Apr. 19, 2012

(65) Prior Publication Data

US 2012/0283147 A1 Nov. 8, 2012

Related U.S. Application Data

(60) Provisional application No. 61/483,368, filed on May 6, 2011.

(51) Int. Cl.
*C09K 8/52* (2006.01)
*C09K 8/12* (2006.01)
(Continued)

(52) U.S. Cl.
CPC .............. *C09K 8/524* (2013.01); *C10G 29/20* (2013.01); *C10G 2300/1096* (2013.01)

(58) Field of Classification Search
CPC ............................ C09K 8/584; Y10S 507/927
(Continued)

(56) References Cited

U.S. PATENT DOCUMENTS 2,143,991 A 1/1939 Loomis
4,192,767 A 3/1980 Flournoy et al.
(Continued)

FOREIGN PATENT DOCUMENTS

CA 2277052 1/1998
CA 2386314 4/2001
(Continued)

OTHER PUBLICATIONS

Reverchon, E., et al., "Hexane Elimination from Soybean Oil by Continuous Packed Tower Processing with Supercritical CO2," Journal of the American Oil Chemists' Society, 2000, pp. 9-14, vol. 77, No. 1.
(Continued)

*Primary Examiner* — Aiqun Li
(74) *Attorney, Agent, or Firm* — Senniger Powers LLP

(57) ABSTRACT

Polymeric naphthenate inhibitors are delivered into production fluids to contact mixtures of oil and water, such as in a hydrocarbon producing formation, production equipment, or processing systems. These polymeric naphthenate inhibitors exhibit surface-active properties causing the inhibitors to self-associate at oil-water interfaces and inhibit interactions between organic acids in the oil and cations or cation complexes in water. The large surface area makes these polymers persistent and effective at low concentrations. These compounds also inhibit aggregation of organic acid carboxylate salts that form when pH and pressure conditions are amenable to organic acid ionization. Preferred inhibitors do not form emulsions due to the formation of unstable mixed interface structures that result in coalescence of dispersed droplets. Naphthenate inhibitor dosages less than 100 ppm can effectively inhibit naphthenate salts or other organic acid salts that can form precipitates or emulsions during crude oil production or processing.

15 Claims, 5 Drawing Sheets

(51) Int. Cl.
*C09K 8/528* (2006.01)
*C09K 8/588* (2006.01)
*E21B 43/16* (2006.01)
*C09K 8/524* (2006.01)
*C10G 29/20* (2006.01)

(58) Field of Classification Search
USPC ........ 507/90, 119, 121, 224, 227; 166/305.1
See application file for complete search history.

(56) References Cited

U.S. PATENT DOCUMENTS

| | | | |
|---|---|---|---|
| 4,210,205 A * | 7/1980 | Allen et al. ................ | 166/271 |
| 4,384,977 A | 5/1983 | Duke | |
| 4,396,530 A | 8/1983 | Duke | |
| 4,446,002 A | 5/1984 | Siegmund | |
| 4,514,322 A | 4/1985 | Swoboda | |
| 4,846,957 A | 7/1989 | Johnson et al. | |
| 5,008,026 A | 4/1991 | Gardner et al. | |
| 5,092,405 A | 3/1992 | Prukop | |
| 5,112,505 A | 5/1992 | Jacobs et al. | |
| 5,130,473 A | 7/1992 | Jacobs et al. | |
| 5,156,675 A | 10/1992 | Breton et al. | |
| 5,213,691 A | 5/1993 | Emmons et al. | |
| 5,252,254 A | 10/1993 | Babaian-Kibala | |
| 5,283,235 A | 2/1994 | Bush et al. | |
| 5,420,040 A | 5/1995 | Anfindsen et al. | |
| 5,425,422 A | 6/1995 | Jamaluddin et al. | |
| 5,482,484 A | 1/1996 | Askestad | |
| 5,500,107 A | 3/1996 | Edmondson | |
| 5,552,085 A | 9/1996 | Babaian-Kibala | |
| 5,755,972 A * | 5/1998 | Hann et al. ................ | 210/701 |
| 5,863,415 A | 1/1999 | Zetlmeisl | |
| 5,948,237 A | 9/1999 | Miller et al. | |
| 5,969,237 A | 10/1999 | Jones et al. | |
| 5,985,137 A | 11/1999 | Ohsol et al. | |
| 6,051,535 A | 4/2000 | Bilden et al. | |
| 6,225,263 B1 | 5/2001 | Collins et al. | |
| 6,294,093 B1 | 9/2001 | Selvarajan et al. | |
| 6,313,367 B1 | 11/2001 | Breen | |
| 6,547,957 B1 | 4/2003 | Sudhakar et al. | |
| 6,716,358 B2 | 4/2004 | Varadaraj | |
| 2004/0072361 A1 | 4/2004 | Varadaraj et al. | |
| 2005/0282711 A1 | 12/2005 | Ubbels et al. | |
| 2007/0125685 A1* | 6/2007 | Goliaszewski et al. .. | 208/251 R |
| 2009/0137432 A1 | 5/2009 | Sullivan et al. | |
| 2010/0294499 A1 | 11/2010 | Lewis et al. | |
| 2011/0203791 A1 | 8/2011 | Jin et al. | |

FOREIGN PATENT DOCUMENTS

| | | |
|---|---|---|
| CA | 2386721 | 4/2001 |
| CA | 2029465 | 2/2002 |
| CA | 2455854 | 2/2003 |
| EP | 1 357 171 A2 | 10/2003 |
| GB | 2337522 | 11/1999 |
| WO | WO9830784 A1 | 7/1998 |
| WO | WO0127438 A1 | 4/2001 |
| WO | WO0129370 A1 | 4/2001 |
| WO | WO03012253 A2 | 2/2003 |
| WO | 2005/085392 A1 | 9/2005 |
| WO | 2007/065107 A2 | 6/2007 |
| WO | 2008/155333 A1 | 12/2008 |
| WO | WO2010124773 A1 | 11/2010 |

OTHER PUBLICATIONS

International Preliminary Report on Patentability for PCT/US2012/034202, dated Nov. 12, 2013, 7 pages.
PCT International Search Report—Mar. 1, 2006.
Trond Erik Havre; "Formation of Calcium Naphthenate in Water/Oil Systems, Naphthenic Acid Chemistry and Emulsion Stability"; Department of Chemical Engineering Norwegian University of Science and Technology; 71 Pages; Oct. 2002.
Inge Harald Auflem; "Influence of Asphaltene Aggregation and Pressure on Crude Oil Emulsion Stability"; Department of Chemical Engineering Norwegian University of Science and Technology; pp. 1-51; Jun. 2002.
Poggesi et al. "Multifunction Chemicals for West African Deep Offshore Fields", SPE 74649, Jan. 2002, pp. 1-6.
Vindstad, et al. "Fighting Naphthenate Deposition at the Heidrun Field", SPE80375, Jan. 2003, pp. 1-7.
Goldszal et al. "Scale and Naphthenate Inhibition in Deep-Offshore Fields" SPE 74661, Jan. 2002, pp. 1-11.
Dr. Otto-Albrecht Neumuller "Rompps Chemie-Lexikon" Franckh'sche Verlagshandlung Stuttgart, 1988, pp. 4153-4157 with coversheet and page.
Gallup et al. "Formation & Mitigation of 'Metallic Soap' Sludge, Attaka, Indonesia Field" SPE 73960, Unocal Indonesia, Mar. 2002, pp. 1-16.
Gulden, Walter "Kein Erdol ohne die Chemie" 2001, pp. 82-92.
T.G. Balson "Something Old, Something New: A Discussion about Demulsifiers" pp. 226-238; Chemistry in the Oil Industry VIII Nov. 3-5, 2003, Manchester Conference Centre, UK, 3 page PROGRAMME.
Ogden, P.H. "Chemicals in the Oil Industry: Developments and Applications", Akzo Chemie UK Ltd, Royal Society of Chemistry, 3 pages.
EPO "Communication of a notice of opposition" Sep. 30, 2009, 11 pages.
Lewis, Richard J., Sr. (2002). Hawley's Condensed Chemical Dictionary (14th Edition). (pp: ). John Wiley & Sons. Online version available at: http://knovel.com/web/portal/browse/display?_EXT_KNOVEL_DISPLAY_bookid=704&VerticalID=0 , Entry: "cation".
Copyright © Webster's Third New International Dictionary, Unabridged, Copyright © 1993 Merriam-Webster.Published under license from Merriam-Webster, Incorporated.http://lionreference.chadwyck.com/searchFulltext.do?id=17573917&idType=offset&divLevel=2&queryId=./session/1247850186_24135&area=mwd&forward=refshelf&trail=refshelf , Headword: "inhibit".
Schlumberger Oilfield Glossary, @ http://www.glossary.oilfield.slb.com/Display.cfm?Term=production, "raw crude oil", "nonhydrocarbon contaminants", "emulsion", and "brine" (Jul. 2009).
Schlumberger Oilfield Glossary, @ http://www.glossary.oilfield.slb.com/Display.cfm?Term=production, "demulsifier" (Oct. 2009).

* cited by examiner

LOW DOSAGE POLYMERIC NAPHTHENATE INHIBITORS

CROSS-REFERENCE TO RELATED APPLICATIONS

This application claims priority to co-pending U.S. provisional patent application Ser. No. 61/483,368, filed on May 6, 2011.

BACKGROUND

Field of the Invention

The present invention relates to methods and compositions for inhibiting the formation of naphthenate precipitates or naphthenate-stabilized emulsions during contact between crude oil containing naphthenic acid and water containing cations.

Background of the Related Art

Crude oil includes various high molecular weight hydrocarbon-containing compounds, frequently including naphthenic acid. Naphthenic acids are classified as carboxylic acids of the general formula R—COOH, where R represents a cyclo-aliphatic structure typically having 10 to 90 carbon atoms and 0 to 6 rings. The term "naphthenic acid" is generally used to account for carboxylic acids present in crude oil, including acyclic and aromatic acids. Naphthenic acids are found predominantly in immature biodegraded crude oils. A special type of naphthenic acid was discovered in 2005, this naphthenic acid has a molecular weight of 1231 Dalton, and has 4 carboxylic groups per molecule. The molecule is often referred as naphthenic tetra acid (TA), tetraprotic acid and also ARN acid. This discovery has lead to a further analysis of naphthenic acid and the discovery of di, tri and tetra acid in crude oil samples. The amount of organic acid present in crude oil is expressed by the total acid number (TAN), often in units of milligrams KOH per gram of crude. For example, crude oil produced from the North Sea, the Far East and Western Africa exhibit high TAN numbers, such as a TAN greater than one (1), including high concentrations of naphthenic acids.

One problem experienced during production of crude oils having a high TAN number and in particular a high tetra acid content, is the formation of calcium naphthenate precipitates and/or naphthenate stabilized emulsions. The ionizable carboxylic acid group present in naphthenic acids exhibits a hydrophilic nature that causes the naphthenic acid molecule to congregate at the oil-water interface. In particular, the four carboxylic acid groups in the naphthenic tetra acid can react to form a network of tetra acid crosslinked by calcium. At low pH (acidic) conditions, the interfacial activity of the naphthenic acids is not so problematic because the predominant species is the charge-neutral carboxylic acid. As the crude oil is produced, the pressure in the crude oil drops and carbon dioxide is lost from the solution. The loss of carbon dioxide causes the pH of the crude oil to increase (become basic) and, in turn, leads to enhanced dissociation of the naphthenic acid. The resulting naphthenates can then act as natural surfactants leading either to stabilized emulsions or solid deposits following complexation with calcium or other cations present in the aqueous phase. The naphthenate deposits can accumulate in flow-lines, heat-exchangers, oil-water separators, desalters, filters, hydro-cyclones, and other oil processing equipment.

When naphthenic acids in crude oil are combined with high-pH (basic), highly mineralized connate or process waters, the processes that separate oil and water can experience severe problems. The neutralization products of naphthenic acids with basic ions in the water tend to form very stable water-in-oil emulsions and/or insoluble sticky calcium naphthenate deposits. The naphthenate deposits are similar in nature to lime soaps that form from fatty carboxylates and calcium chloride, sometimes known as "soap scum." These phenomena can hamper the oil production considerably and result in high treatment costs.

Existing treatments to prevent the formation of calcium naphthenate precipitates and emulsions during oil production include the injection of large volumes of acetic acid in order to decrease the pH of the oil and water phases, thus favoring naphthenic acid over the formation of naphthenate salts. However, a continuous injection of about 100 to 1000 parts per million (ppm) of acetic acid is required to achieve a pH below at least 6.0 and sometimes even below 5.2. However, this acid is very corrosive and presents various health, safety, and environmental issues. Furthermore, the sheer volume of acetic acid solution that is necessary represents a significant storage and supply problem, especially on offshore oil production platforms. Also, lowering the pH of the produced waters may lead to serious internal corrosion of the crude oil processing equipment. The result is that preventing the formation of naphthenate precipitates and emulsions comes at a high cost.

Publication WO 2006/025912 A2 describes a method of inhibiting the formation of naphthenate precipitates and emulsions during the production of crude oil. The low dosage naphthenate inhibitors require smaller volumes of active chemical, lower dosage rates, smaller pH changes, and lower overall costs. The inhibitor composition is added to a mixture of water and oil in an amount that is effective to inhibit interaction between cations in the water and organic acid in the oil that can lead to the formation of organic salts. The cations originating from the water, such as connate water, formation water or seawater, may include an inorganic cationic species, such as calcium cations, magnesium cations, sodium cations, or combinations thereof. The organic acid originating from the oil may include a naphthenic acid. The inhibitor compositions are suitable for use with oil having a total acid number (TAN) greater than 0.05 and even a TAN greater than 1.

Should any metal naphthenate salts already exist prior to adding the inhibitor or form despite the presence of the inhibitor, the inhibitor composition may additionally inhibit the agglomeration of these reaction products of metal ions and organic acids in the oil via crystal habit modification. The term "crystal habit" refers to the typical course of events that occur when a material becomes insoluble by forming a specific type of crystal structure. One type of crystal habit modification can be brought about by adding inhibitor molecules that interfere with crystallization to the extent that the crystals are unstable, do not agglomerate, and therefore do not form deposits on oil production equipment.

The inhibitor composition inhibits the cations and organic acid, such as a naphthenic acid, from interacting along an oil-water interface, such as an oil-water emulsion. Preferably, the inhibitor composition inhibits formation of an organic salt, such as a naphthenate salt, along an oil-water interface. More specifically and preferably, the inhibitor composition inhibits naphthenate salt formation along an oil-water interface. Accordingly, the inhibitor composition may have a hydrophilic portion and a lipophilic portion.

The above methods are capable of inhibiting calcium naphthenate formation, at low dosage and without decreasing the produced water pH to the corrosion envelope. Field experience and lab testing show that the inhibitor residence time on the oil/water interface may be relatively short (10-60 min). Although this can be mitigated by the use of a fast emulsion resolution and fast dehydration to decrease the interface surface area, supplemental treatment might be required in some cases. In addition at high pH and longer residence time, calcium naphthenate might still be found, when left untreated.

An important feature of the low dose naphthenate inhibitor is that these inhibitors do not influence the dehydration process. This is achieved by selecting hydrotropes that do have an affinity for oil/water interface orientation, however, do not have a strong surfactant behavior. The hydrophilic-lipophilic balance (HLB) contrast of the selected material is rather low. By contrast, dodecylbenzene sulfonic acid (DDBSA) is a strong surfactant and also a good naphthenate inhibitor. However, because of the high surfactant, emulsifying behavior, DDBSA influences the dehydration process and actually has a detrimental effect on the required time to dewatering of the crude. In most offshore installations, the residence time is too short for DDBSA to be used as inhibitor.

BRIEF SUMMARY

The present invention provides a method comprising supplying at least one surface active polymer compound into a mixture of divalent cation-containing water and organic acid-containing oil at a dosage rate that is effective to self-associate at interfaces between the water and oil and inhibit formation of divalent cation salts of the organic acid. For example, the surface active polymer compound may be used to inhibit the formation of naphthenate salts. Optionally, the polymer compound may be added before a choke, manifold, turret, or a combination thereof, wherein the pressure downstream of the choke, manifold, turret, or a combination thereof is reduced causing a release of carbon dioxide gas from the oil.

Various embodiments describe the composition of the surface active polymer, which may be a copolymer or terpolymer. For example, one embodiment of the polymer compound is a copolymer of acrylic acid and 2-Acryloylamido-2-methylpropanesulfonic acid (AMPS) at a ratio between 9:1 and 1:9 to a molecular weight from 700 to 20,000 Dalton. In another embodiment, the polymer compound is a terpolymer of an ester-acrylic acid, 2-Acrylamido-2-methylpropanesulfonic acid (AMPS) and an unsaturated aromatic monomer reacted by free radical reaction at a ratio in between 8:1:1 and 1:8:1 and 1:1:8 or all between possible ratios to an average molecular weight from 700 to 20,000 Daltons. Other polymer compounds are described herein.

DETAILED DESCRIPTION

Figure 1:
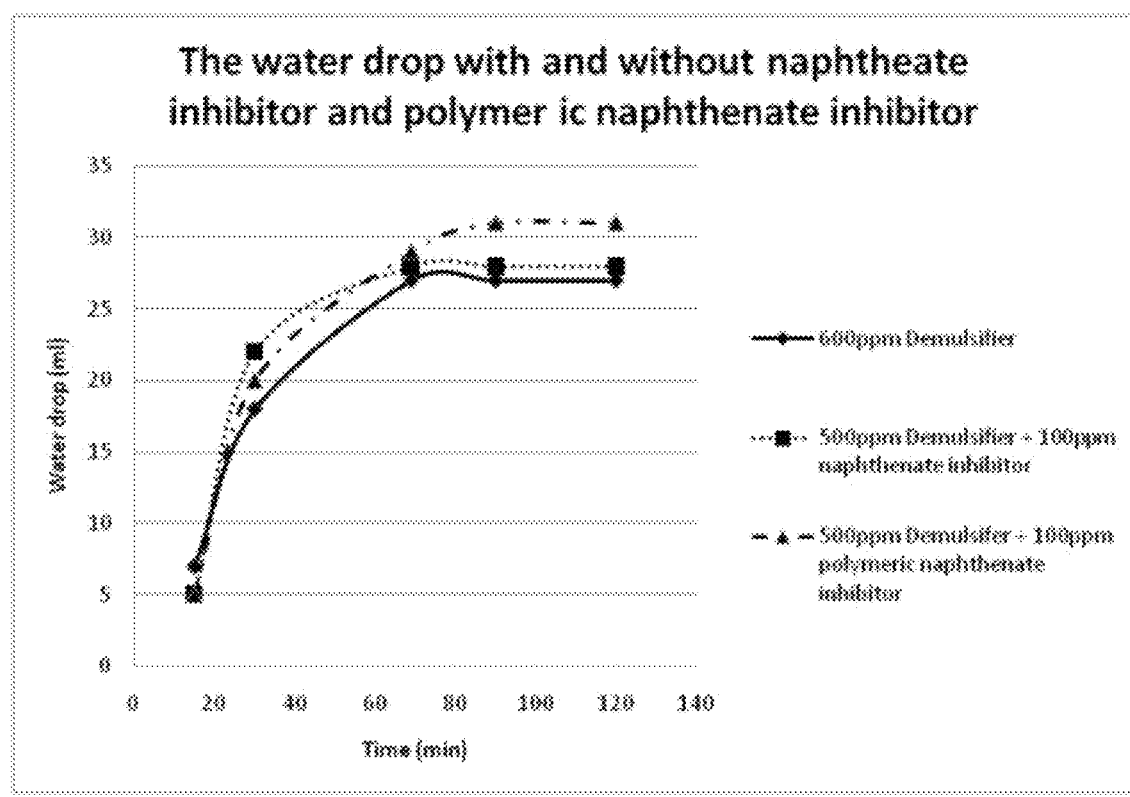
FIG. 1 is a graph of the water drop with and with-out naphthenate inhibitor and polymeric naphthenate inhibitor.

The present invention is directed to low dosage polymeric naphthenate inhibitor (LDPNI) compounds and formulations including those compounds. These compounds are capable of inhibiting naphthenate salt formation, precipitation and emulsions at substantially lower dosage than with existing surfactant dispersants or acetic acid practices.

Preferred naphthenate inhibitor compounds are polymeric in nature having 5 to 300 repeating units reflecting a molecular weight from about 700 to 20,000 Dalton. These polymers may be formed through free radical polymerization. The polymer contains an acrylic acid ester monomer with an ester side chain and an ionic polyacrylate. The monomeric ratio is balanced to form an interfacially active polymer. Table 1 provides an overview of several examples of these polymer compositions, including examples of copolymer compositions and terpolymer compositions.

The ester side chain of the acrylate may have a chain length of 2 to 18 carbons and may be branched. The function of the side chain is to promote oil solubility, where an increase in the length of the side chain provides greater oil solubility.

The ionic groups might be carboxylic or phosphorus or sulphonic, for example acrylic acid or 2-Acrylamido-2-methylpropanesulfonic acid (AMPS). The ionic groups will promote water solubility. It is preferred to neutralize the acid group. AMPS is preferred over acrylic acid in the application in high concentration of calcium salt and high saline brines.

To balance the solubility, a third monomer may be added. For example, a third compound, such as styrene, divinyl benzene, N-vinylpyrrolidone and 2-hydroxyethyl methacrylate, might be included in the polymer to influence the preference for the oil-water interface.

The compositions of the invention are preferably added at a concentration of less than 500 ppm in the mixture of oil and water, more preferably at less than 150 ppm, even more preferably less than 50 ppm, and optionally even less than 25 ppm. Optionally, the inhibitor composition may further comprise a hydrotropic low dose naphthenate inhibitor, acetic acid, but preferably less than 100 ppm acetic acid. However, it is preferable to provide the inhibitor composition in the absence of acetic acid.

In one embodiment, the amount of inhibitor composition added to the oil and water mixture is effective to protonate naphthenate salts formed prior to the addition of the inhibitor composition. Preferably, the methods of the invention are characterized in that the pH of the oil and water mixture is greater than 5.2 following the addition of the inhibitor composition, more preferably greater than 6, and most preferably about 7.

The low dosage polymeric naphthenate inhibitor compositions of the invention have greater molecular weight than the naphthenate inhibitors disclosed in WO 2006/025912, while maintaining the typical HLB balance of a short aliphatic chain and an ionic group. The larger molecule occupies a greater amount of the surface area at the water interface and thus provides a good barrier to carboxylic acid dissociation. The larger molecule also has lower mobility, which results in a longer residence time on the interface and therefore results in a more efficient inhibition. The larger molecule also provides greater surface area coverage, such that less inhibitor may be required to achieve inhibition. Another important advantage of the larger molecule is that the surfactant properties are not increased and dewatering is not effected.

A naphthenic acid is an oil soluble hydrocarbon that has a carbon number from 4 to 100 and at least one, up to 4 carboxylic groups. Furthermore, the organic group in the naphthenic acid might be an aliphatic molecule, an aliphatic with one or more 5 or 6 ring structure and/or an aromatic structure.

The fluids are typically produced as a mixture of water, crude oil and gas having an initial pH of 4-6. As the fluids are processed to remove gas and water, the pH will increase to the range 6 to 9. The water is often in the form of a brine that contains calcium. Naphthenic acids can reaction similarly with calcium and other multivalent ions such as magnesium, iron, barium and strontium.

The polymeric naphthenate inhibitors may, for example, be applied to: (1) oil containing naphthenic mono acid having a molecular weight (MW) from 200 to 600 Daltons, which can cause tight emulsions and poor water quality after dehydration; (2) oil containing naphthenic di-, tri-, and tetra-acid having a MW from 200 to 1400 Daltons, which can crosslink with multivalent cations; and (3) oil containing compounds that include linear fatty acids from 200 to 600 Daltons, which cause soap emulsions.

EXAMPLES

Example 1

A solution was prepared as a surrogate for connate water by combining 1% calcium chloride and 2.5% sodium chloride in water and adjusting the pH to 8. Another solution was prepared as a surrogate for crude oil by dissolving extracted naphthenic tetra acid from calcium naphthenate deposit in organic solvent. Three (3) ml of the connate water surrogate solution was combined with 3 ml of the crude oil surrogate solution and shaken 10 times. Upon standing, an oil-in-water emulsion was observed, apparently stabilized against droplet coalescence by a layer of calcium naphthenate at the interface of each droplet. This experiment was repeated with the addition of several inhibitors and organic acids at 10, 100 and 250 ppm to evaluate their ability to coalesce the droplets.

TABLE 2

| Coalescense directly after mixing with inhibitor | | | | |
|---|---|---|---|---|
| # | Sample | 10 ppm | 100 ppm | 250 ppm |
| 1 | Butyl phosphate ester | no | no | no |
| 2 | 2 Ethylhexanol phosphate ester | slightly | yes | yes |
| 3 | DDBSA | slightly | yes | yes |
| 4 | Acetic acid | no | slightly | yes |
| 5 | Polymer Experiment 1 | no | yes | yes |

TABLE 1

| Polymers | | | | |
|---|---|---|---|---|
| Polymer Experiment (#) | Monomer (mol ratio) | m % Dry content (125° C.) | Mn, theor. | Appearance (20° C.) |
| 01 | EHA/AMPS (1/1) | 30.7 | >20,000 | Clear, low visc. |
| 02 | EHA/AMPS (1/1) | 29.5 | ±2,000 | Clear, low visc. |
| 03 | EHA/AMPS (1/1) | 29.1 | ±10,000 | Clear, low visc. |
| 04 | EHA/Sty/AMPS (1/1/1) | 33.3 | ±2,500 | Clear, higher visc. |
| 05 | EHA/Sty/AMPS (1/1/1) | 31.5 | ±12,500 | Clear, higher visc. |
| 06 | EHA/DVB/AMPS (1/0.3/1) | 33.5 | Branched | Clear, higher visc. |
| 07 | EHA/Sty/AMPS (1/1/1) | 43.7 | ±1,500 | Clear, higher visc. |
| 08 | EHA/Sty/AMPS (1/1/1) | 40.5 | ±5,000 | Hazy/Opaque, higher visc. |
| 09 | EHA/AMPS (1/0.75) | 39.7 | ±2,000 | 2 Phases 1/1, low visc. |
| 10 | EHA/AMPS (1/0.5) | 36.3 | ±2,000 | Clear, low visc. |
| 11 | EHA/AMPS (1/0.33) | 52.9 | ±2,000 | 2 Phases 1/1, higher visc. |
| 12 | EHA/AMPS (1/0.33) | 38.4 | ±2,000 | Clear, low visc. |
| 13 | EHA/Sty/AMPS (1/0.5/0.5) | 36.8 | ±2,000 | Clear, higher visc. |
| 14 | EHA/NVP/AMPS (1/0.33/0.33) | 37.4 | ±2,000 | Hazy/Transl., higher visc. |
| 15 | EHA/HEMA/AMPS (1/0.33/0.33) | 41.7 | ±2,000 | Clear, higher visc. |

EHA = 2-Ethylhexyl acrylate
AMPS = 2-Acryloylamido-2-methylpropanesulfonic acid
Sty = Styrene
DVB = DiVinylBenzene
NVP = N-vinylpyrrolidone
HEMA = 2-hydroxyethyl methacrylate TABLE 2-continued Coalescense directly after mixing with inhibitor

| # | Sample | 10 ppm | 100 ppm | 250 ppm |
|---|---|---|---|---|
| 7 | Polymer Experiment 2 | slightly | yes | yes |
| 8 | Polymer Experiment 3 | no | no | slightly |
| 9 | Polymer Experiment 4 | yes | yes | yes |
| 10 | Polymer Experiment 5 | no | slightly | yes |
| 11 | Polymer Experiment 6 | no | no | slightly |

As can be observed in Table 2, the polymers associated with Polymer Experiments 2 and 4 in Table 1 show good inhibition at low concentration. The performance is equal to the already existing inhibitors, including the 2 ethylhexanol phosphate ester and the DDBSA. The polymer samples labeled Polymer Experiment 1-6 in Table 2 correspond to the polymers 1-6 described in Table 1.

Example 2

FIG. 1 is a graph of the water drop with: (1) 600 ppm demulsifier; (2) 500 ppm demulsifier combined with 100 ppm DDBSA (same as Sample #3 in Table 2); and (3) 500 ppm demulsifier combined with 100 ppm of the polymeric naphthenate inhibitor identified as Polymer Experiment #4 in Tables 1 and 2. The demulsifier that is used in each of these solutions is a mixture of alcoylated nonyl butyl resin and a complex polyol ester in a ratio of 3:1. The polymeric napthenate inhitor improved the settling of water significantly compare to without and traditional naphthenate inhibitor.

Figure 2:
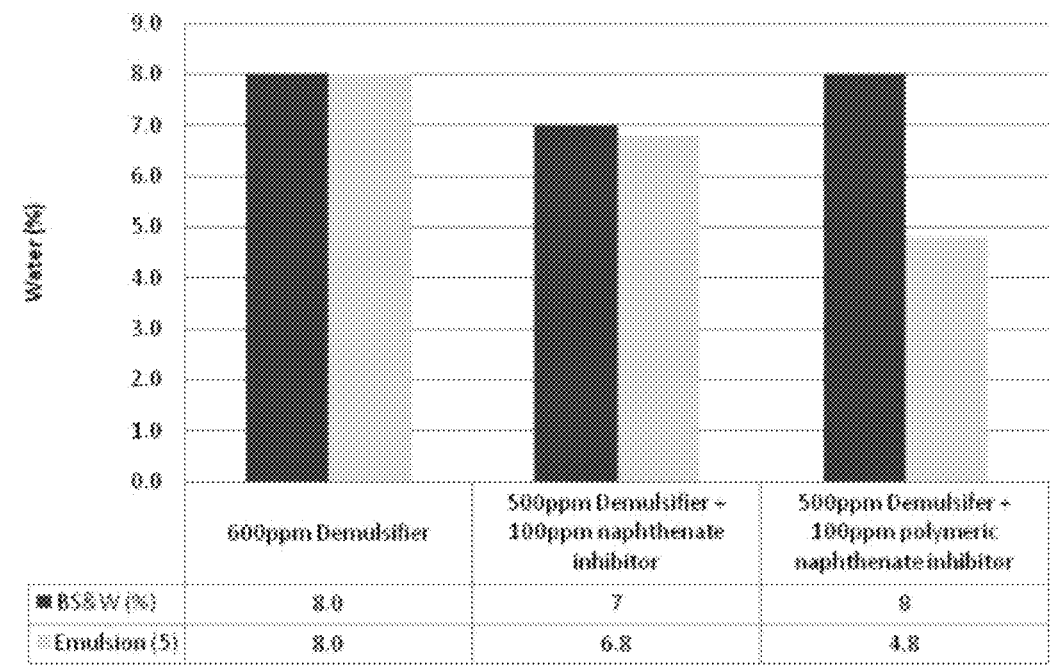
FIG. 2 is a bar graph showing the amount of water retained in the top cut of the oil layer after 2 hours when a demulsifier is used alone, with a naphthenate inhibitor, and with a polymeric naphthenate inhibitor.

FIG. 2 is a bar graph showing the amount of water retained in the top cut of the oil layer after 2 hours when using the demulsifier alone, the demulsifier and DDBSA combination, and the demulsifier and polymeric napthenate inhibitor combination, each as described with respect to FIG. 1. The polymeric naphtenate inhibtor reduced the amount of emulsion by about 50% compared to using the demulsifier alone, and reduced the amount of emulsion by about 25% compared to the combination of demulsifier and DDBSA naphthenate inhibitor. "BS&W" stands for black solids and water.

Figure 3:
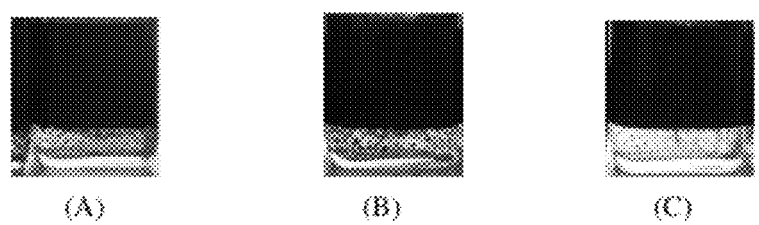
FIGS. 3A to 3C are side views of a separate water and oil mixtures after treatment with a demulsifier alone, the same demulsifier with a naphthenate inhibitor, and the same demulsifier with a polymeric naphthenate inhibitor, respectively.

FIG. 3A is a side view of a water and oil mixture after treatment with the demulsifier. The water quality is OK. FIG. 3B is a side view of a similar water and oil mixture after treatment with the combination of demulsifier and the DDBSA naphthenate inhibitor. Again, the water quality is OK. FIG. 3C is a side view of a similar water and oil mixture after treatment with the combination of demulsifier and the polymeric naphthenate inhibitor (Polymer Experiment #4). The water quality is good, due to the reduced amount of naphthenate stabilized emulsions.

Example 3

The naphthenate inhibitor works by crowding the interface between oil and water, such that naphthenic acid migration to the interface is blocked and reaction between the naphthenic acid in the oil and calcium in the water is prevented. The ability to prevent depletion of the naphthenic acid concentration in the oil bulk phase is therefore a measure of the effectiveness of the inhibitor to inhibit the formation of calcium naphthenate. In the following example, the concentration of naphthenic acid in an oil phase is measured before and after contacting the oil with a calcium brine solution. After mixing the oil and brine, the depletion is calculated. A 100% depletion means that all naphthenic acid has reacted to form naphthenate salts.

Figure 4:
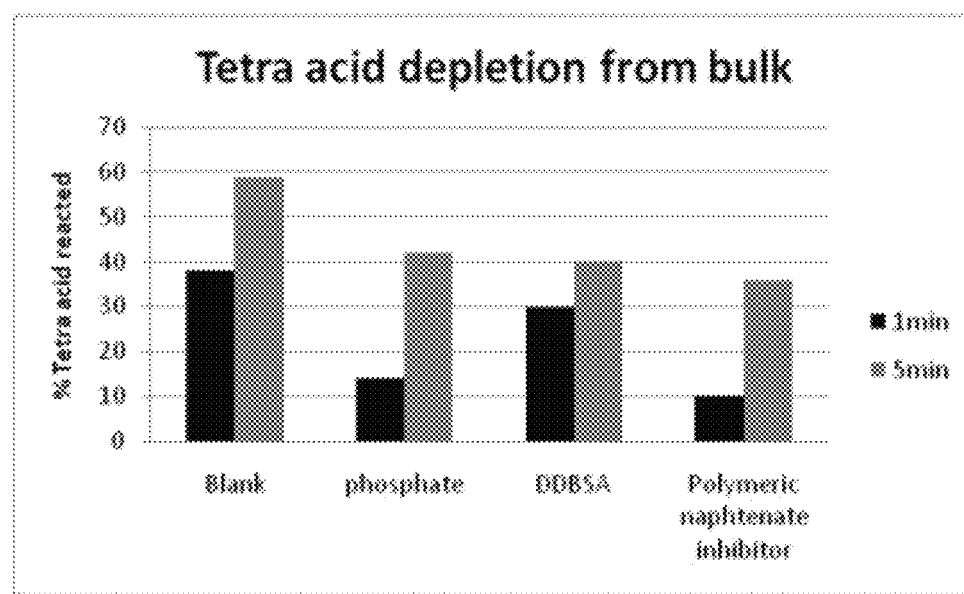
FIG. 4 is a bar chart showing the Tetra Acid (TA) amount reacted in a blank and reacted in the presence of various inhibitors.

FIG. 4 is a bar chart showing the tetra acid (TA) amount reacted in the presence of a blank, phosphate, DDBSA and the polymeric naphthenate inhibitor identified in Table 1 as Polymer Experiment #4, respectively. As can be observed in FIG. 4, the polymeric naphthenate inhibitor shows the lowest depletion after 1 and 5 minutes reaction, as compared to the blank, a mixture of the phosphate esters at in table 2 (i.e., a mixture of butyl phosphate ester and 2 ethylhexanol phosphate ester), and DDBSA. Accordingly, the polymeric naphthenate inhibitor shows the best performance.

Example 4

An oil phase containing naphthenic tetra acid and a water phase containing calcium will form a film at the oil-water interface. The strength of that film increases as more calcium naphthenate forms. To evaluate the effect of the naphthenate inhibitor on the calcium naphthenate formation, the film strength is measured with and without naphthenic acid inhibitors.

Figure 5:
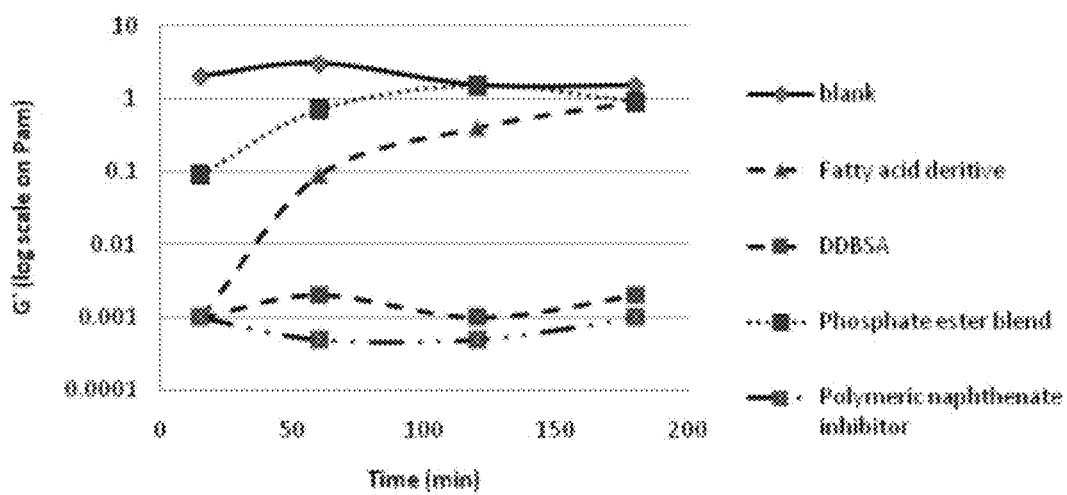
FIG. 5 is a graph of film strength for the same solutions analyzed in Example 3 (FIG. 4).

FIG. 5 is a graph of film strength for the same solutions analyzed in Example 3. The G' is a measure for the film elasticity and the G" is a measure for the viscosity index. Compared with other inhibitors, the polymer naphthenate inhibitor (referred to as Polymer Experiment #4 in Table 1) and DDBSA naphthenate inhibitor do not allow the calcium naphthenates to develop and reach an appreciable film strength. In other words, the lower film strength indicates that the polymeric naphthenate inhibitor prevented the cross-linking of naphthenic tetra acid with calcium ions at the solvent/brine interface.

Example 5

Figure 6:
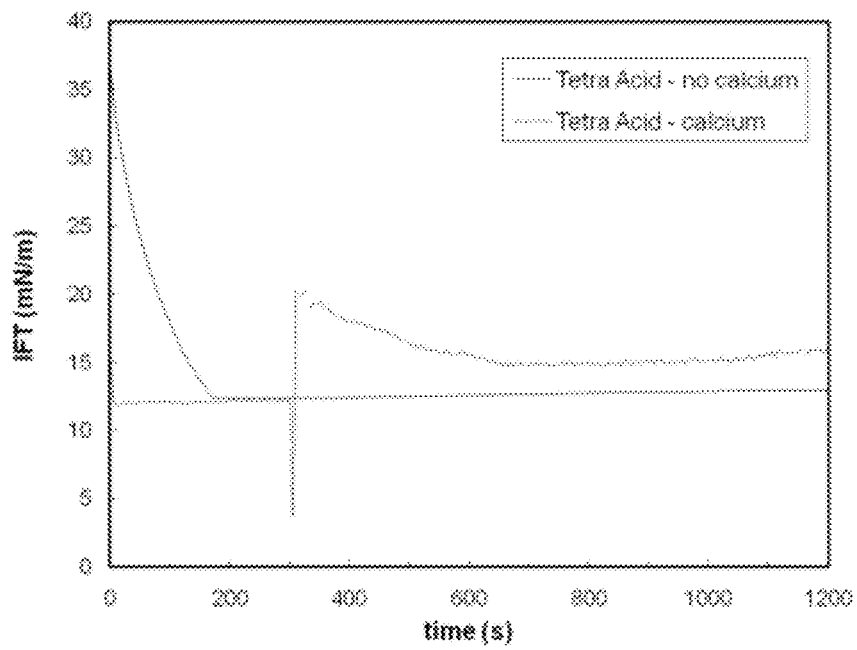
FIGS. 6 and 7 show the effect of the inhibitor on the interfacial tension after adding calcium.

The effect of naphthenate inhibitor on the reaction of naphthenic tetra acid on an oil water interface is determined. The measurement is performed with a pendant drop interfacial tensiometer. The test is conducted as follows: The tetra acid is dissolved in the organic solvent phase. A droplet of the organic phase is submerged in brine, whereafter the interfacial tension is measured. After 300 seconds, calcium is added to the brine, whereafter the tetra acid reacts with the calcium on the droplet interface and the interfacial tension (IFT) is increased instantly by about 8 milliNewtons per meter (mN/m). This sudden increase is due to a salt/complex formation reaction occurring between the naphthenic acid molecules and $Ca^{2+}$ ions at the oil/water interface. In FIG. 6, the IFT with and without calcium can be observed. One can notice that this difference decreases with aging to final equilibrium value 4 mN/m.

Figure 7:
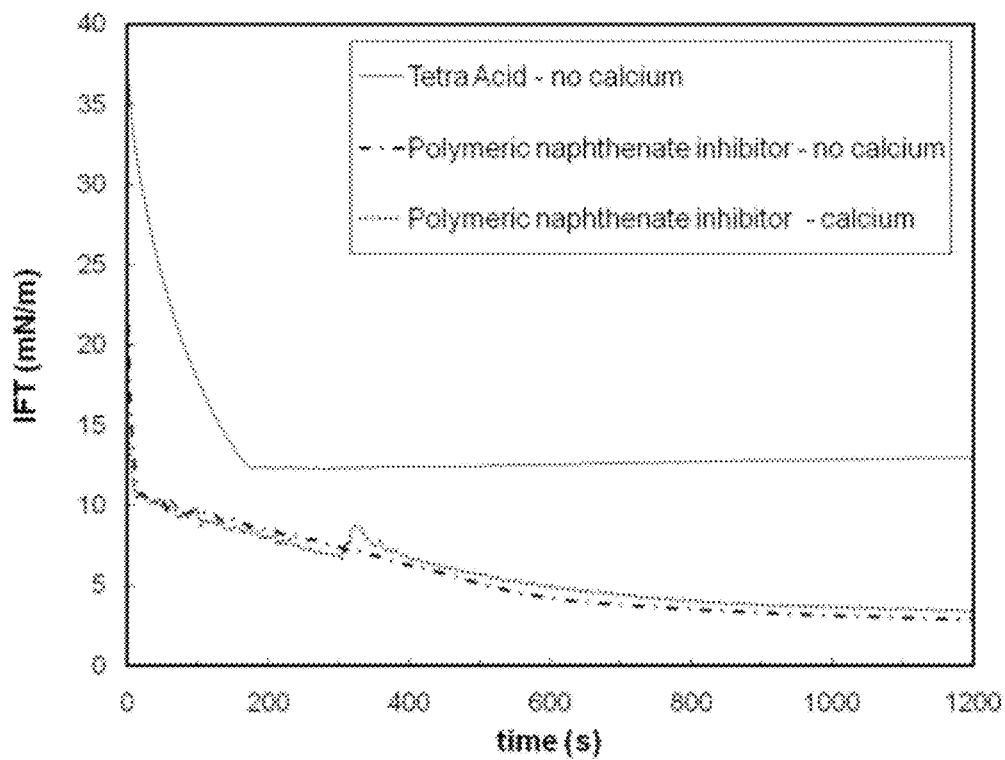

This experiment was repeated, except that the polymeric naphthenate inhibitor referred to as Polymer Experiment #4 in Table 1 was added to the organic phase to observe the effect on the calcium naphthenate formation. FIGS. 6 and 7 show the effect of the inhibitor on the interfacial tension after adding calcium. A minimal change of the interfacial tension indicates that the inhibitor effectively prevents the calcium-tetra acid reaction.

Table 3, below, gives an overview of the various aspects of inhibition, where the polymeric inhibitor gives the best overall properties in the terms of preventing gelstrength development, low increase of the interfacial tension when added in calcium (RIFT initial value) and preventing depletion of Tetra acid form the bulk phase.

TABLE 3

Overview

| Inhibitor | G'180 min (Pas) | Depletion (% after 1 and 5 min) | ΔIFT |
|---|---|---|---|
| Model Naphthenic Tetra Acid | 1.75 | 37/58 | 8.1 |
| Phosphate ester blend as in Table 2 | 0.7710 | 13/42 | 7 |
| DDBSA As in Table 2 | — | 30/40 | 2.9 |
| Posphate ester 2 | 0.0028 | 35/57 | 1.8 |
| Polymeric naphthenate inhibitor | — | 10/35 | 1.3 |

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   contacting a surface active copolymer of an ester-acrylate monomer and a 2-Acrylamido-2-methylpropanesulfonic acid (AMPS) monomer, wherein the ester group of the ester-acrylate monomer comprises a straight or branched $C_8$ to $C_{18}$ alkyl group, with a mixture of divalent cation-containing water and naphthenic acid-containing oil at a dosage rate that is effective to self-associate at interfaces between the water and oil and inhibit formation of divalent cation salts of naphthenic acid, wherein the polymer is contacted with the mixture before a choke, manifold, turret, or a combination thereof, and wherein the pressure downstream of the choke, manifold, turret, or a combination thereof is reduced causing a release of carbon dioxide gas from the oil.

2. The method of claim 1, wherein the naphthenic acid has an average molecular weight of between 200 and 1400 Daltons.

3. The method of claim 1, wherein the divalent cation salts of the organic acid include naphthenate salts.

4. The method of claim 1, wherein the polymer is a copolymer of the ester-acrylate and 2-Acrylamido-2-methylpropanesulfonic acid (AMPS) at a ratio between 9:1 and 1:9 to a molecular weight from 700 to 20,000 Dalton.

5. The method of claim 1, wherein the dosage rate of the surface active polymer is less than 500 ppm.

6. The method of claim 1, wherein the ester-acrylate monomer comprises 2-ethylhexyl acrylate.

7. A method comprising:
   contacting a surface active polymer with a mixture of divalent cation-containing water and organic acid-containing oil at a dosage rate that is effective to self-associate at interfaces between the water and oil and inhibit formation of divalent cation salts of the organic acid, wherein the polymer is contacted with the mixture before a choke, manifold, turret, or a combination thereof, wherein the pressure downstream of the choke, manifold, turret, or a combination thereof is reduced causing a release of carbon dioxide gas from the oil, and wherein the polymer is a terpolymer of an ester-acrylate, 2-Acrylamido-2-methylpropanesulfonic acid (AMPS) and an unsaturated aromatic monomer reacted by free radical reaction at a ratio in between 8:1:1 and 1:8:1 and 1:1:8 having an average molecular weight from 700 to 20,000 Daltons and the unsaturated aromatic monomer is selected from styrene, divinylbenzene, or a combination thereof.

8. The method of claim 7, wherein the ester group of the ester-acrylate monomer is a $C_2$ to $C_{18}$ alkyl group.

9. The method of claim 7, wherein the ester group of the ester-acrylate monomer is a $C_8$ to $C_{18}$ alkyl group.

10. The method of claim 7, wherein the ester-acrylate monomer comprises 2-ethylhexyl acrylate.

11. The method of claim 10, wherein the unsaturated aromatic monomer comprises styrene.

12. The method of claim 10, wherein the unsaturated aromatic monomer comprises divinylbenzene.

13. The method of claim 7, wherein the unsaturated aromatic monomer comprises styrene.

14. The method of claim 7, wherein the unsaturated aromatic monomer comprises divinylbenzene.

15. A method comprising:
    contacting a surface active polymer with a mixture of divalent cation-containing water and organic acid-containing oil at a dosage rate that is effective to self-associate at interfaces between the water and oil and inhibit formation of divalent cation salts of the organic acid, wherein the polymer is contacted with the mixture before a choke, manifold, turret, or a combination thereof, and wherein the pressure downstream of the choke, manifold, turret, or a combination thereof is reduced causing a release of carbon dioxide gas from the oil, wherein the polymer is a copolymer of an ester-acrylate monomer and a 2-Acrylamido-2-methylpropanesulfonic acid (AMPS) monomer, and wherein the ester group of the ester-acrylate monomer comprises a straight or branched $C_8$ to $C_{18}$ alkyl group.

* * * * *